United States Patent [19]

Broussard

[11] Patent Number: 4,619,298
[45] Date of Patent: Oct. 28, 1986

[54] CABLE GREASING ADAPTOR

[75] Inventor: Ronney L. Broussard, Pollock, La.

[73] Assignee: Antonia Products, Inc., Jena, La.

[21] Appl. No.: 710,474

[22] Filed: Mar. 11, 1985

Related U.S. Application Data

[63] Continuation-in-part of Ser. No. 532,206, Sep. 14, 1983.

[51] Int. Cl.⁴ .............................................. B65B 3/04
[52] U.S. Cl. .................................. 141/384; 141/392; 184/105.1
[58] Field of Search ............................... 141/382–386, 141/346–362, 392; 184/105 R, 105 A, 105 B, 105 C

[56] References Cited

U.S. PATENT DOCUMENTS

| 1,515,026 | 11/1924 | Frauenfelder | 141/384 |
| 1,659,204 | 2/1928 | Klems | 141/384 |
| 1,799,433 | 4/1931 | Murphy | 141/384 |
| 1,944,191 | 1/1934 | Newmark et al. | 141/384 |

FOREIGN PATENT DOCUMENTS 230318  3/1925  United Kingdom ............... 141/384

Primary Examiner—Houston S. Bell, Jr.

[57] ABSTRACT

An apparatus for lubricating cables including a main body and a grease fitting, the grease fitting being fitted into a first end of the main body opposite a second internally threaded end.

20 Claims, 12 Drawing Figures

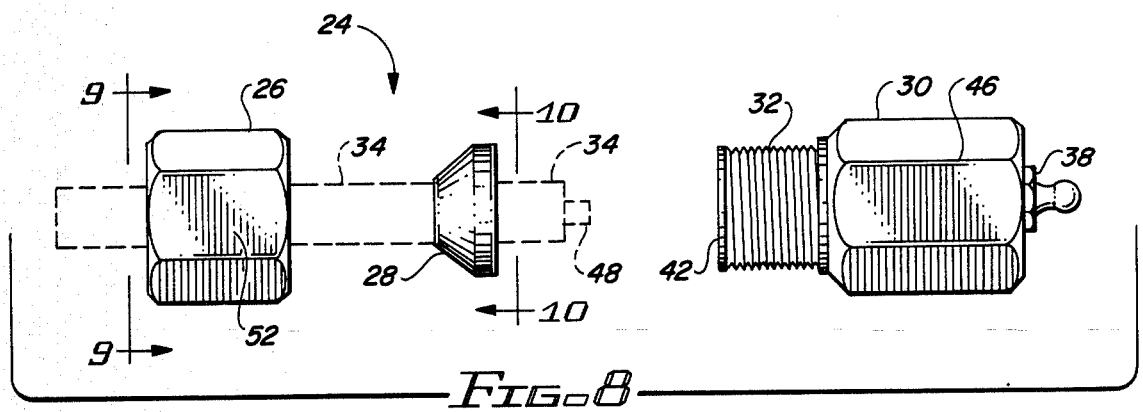
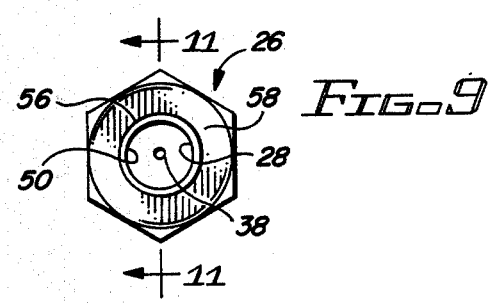
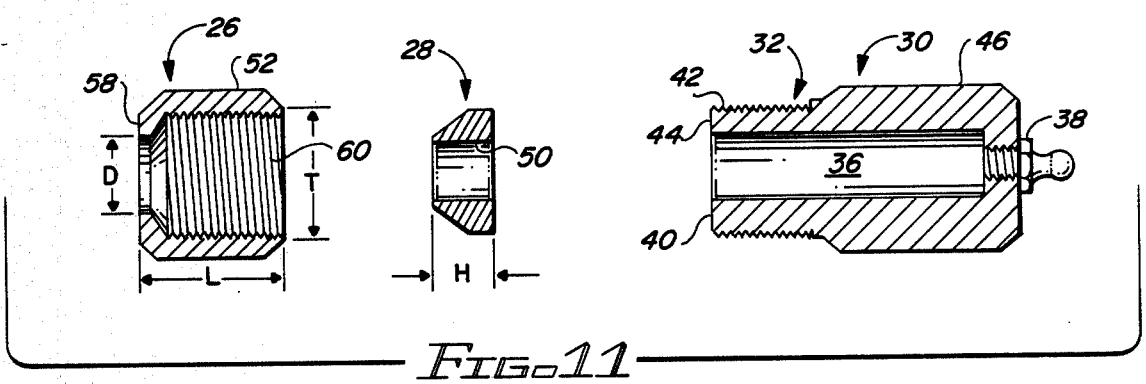
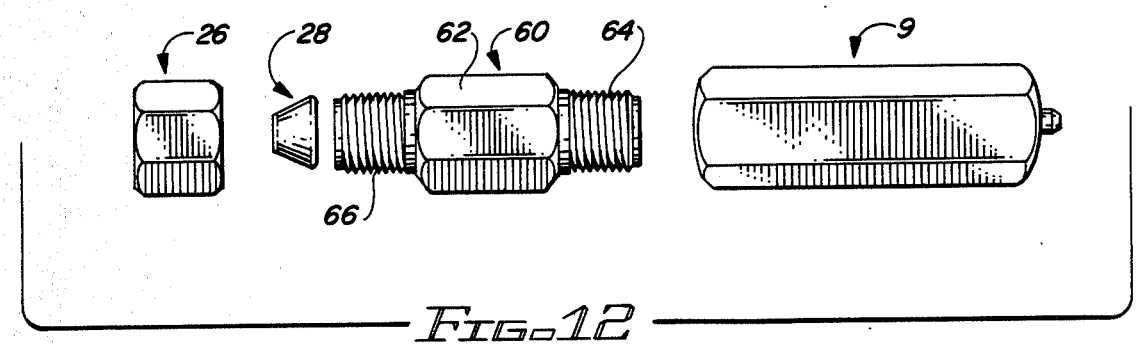

CABLE GREASING ADAPTOR

CROSS REFERENCE TO A RELATED APPLICATION

This application is a continuation-in-part of U.S. patent application Ser. No. 532,206 filed Sept. 14, 1983.

BACKGROUND OF THE INVENTION

The commonly used method of greasing a speedometer and a tachometer cable, in most types of vehicles, is to remove the cable housing from the rear of the speedometer or tachometer and then remove the cable from the cable housing. The cable has to be greased by hand and then replaced in the cable housing. In so doing, much of the grease is rubbed off of the cable onto the sides of the entrance to the cable housing, leaving less grease on the cable after the cable enters the cable housing.

Speedometer and tachometer cables are designed to be removed from the top end of the cable housing only. The bottom end of the cable housing is attached to either the motor or the transmission of the vehicle. In most cases, the cable housing would have to be disconnected at the motor or transmission end of the cable before the cable could be inserted fully into the top of the cable housing.

Most speedometers or tachometers are mounted on some form of a dash board, and one end of the cable is attached thereto. The end of the cable attached to the speedometer or tachometer is not readily accessible without removing many obstacles.

The cable and cable housing are more accessible at the bottom end connected to the motor or transmission of a vehicle. It is common to remove this end of the cable in order to reattach the cable to the speedometer or tachometer at the dash board entrance.

The invention shown in FIG. 1 and FIG. 2 is attached to the bottom end of the cable housing and an ordinary grease gun can be attached at the other end of the invention. Grease can then be pumped into the cable housing where the speedometer or tachometer cable rotates. Grease will fill the housing thoroughly leaving no ungreased places between the cable and the cable housing. The cable itself can be completely greased with the invention. The invention can be removed and the cable and cable housing reattached to the motor or transmission within a matter of minutes.

The invention shown in FIG. 1 and FIG. 2 will benefit the owner of any vehicle having a speedometer or tachometer cable. Such cables break if they are not properly greased, and replacement can be very costly. The present method of greasing such cables is expensive because of the time required. The average person does not have the knowledge to remove the speedometer or tachometer cable from the dash entrance of a vehicle. The invention will enable the novice, as well as the professional mechanic, to quickly and efficiently grease such cables at regular intervals, avoiding replacement and high labor costs.

In an alternate embodiment of the invention shown in FIGS. 3 to 7, an apparatus is provided for lubricating marine steering cables connected to outboard motors and to outdrive units connected to inboard marine engines. In the alternate embodiment, threads are located on the interior of the apparatus of the invention to fit external threads on the end of the steering cable shaft or other cable to be greased.

In further embodiments of the invention shown in FIGS. 8 through 12, an apparatus is provided for lubricating a speedometer, tachometer, or other cable which has no nut attached thereto.

SUMMARY OF THE INVENTION

The marine cable lubricating apparatus of the invention includes a main body and a grease fitting. The grease fitting is fitted into a first end of the main body opposite a second internally threaded end. A hole is centered and extends through the entire length of the main body.

There are internal threads on the second end of the main body which fit the external threads of a cable to be greased. The apparatus is particularly suited for lubricating marine steering cables on outboard motors and on outdrive units connected to inboard marine engines.

The apparatus of the invention for lubricating a cable having a nut attached thereto shown in FIGS. 8-11 includes a main body having threads on the outside thereof, a nut connected to the main body having a hole therein sufficiently large to receive a cable, and a flexible washer received inside said nut for contact by said main body, the washer having a hole therein for receipt of the cable to be lubricated. The washer is adapted to be compressed about the cable to form a seal therewith when the main body is threaded into the nut, thus enabling the lubrication of cables having no nut connected thereto.

The main body, preferably made of ferrous metal, has a hexagonal outer surface which allows a wrench to be used in attaching the invention to the steering cable shaft. A press-in type fitting is preferably used to reduce cost. Alternatively, the hole of the main body can be tapped and a threaded fitting installed.

The internal thread size on the main body may be changed to fit various sized external threads of a cable to be greased. The body and the hole therein may also be reduced or enlarged as necessary to accommodate various internal thread sizes. Thus, the invention can be adapted to various sized steering cable shafts.

The main body can be quickly produced in its entirely during the manufacturing process.

BRIEF DESCRIPTION OF THE DRAWINGS

FIG. 8 is an exploded plan view of an embodiment 24 of the invention for lubricating a cable housing having no nut connected thereto;

FIG. 9 is plan view of assembly 24 taken along lines 9—9 of FIG. 8;

FIG. 10 is a plan view of element 28 taken along lines 10-11 of FIG. 8;

FIG. 11 is a cross-sectional view of assembly 24 taken along lines 11—11 of FIG. 9; and FIG. 12 is an exploded plan view of a further embodiment of the invention.

DETAILED DESCRIPTION OF THE INVENTION

Figure 1:
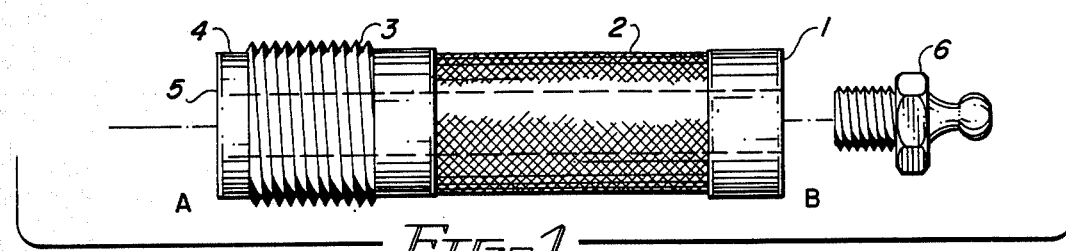
FIG. 1 is a plan view of the speedometer and tachometer greasing apparatus of the invention.
Figure 2:
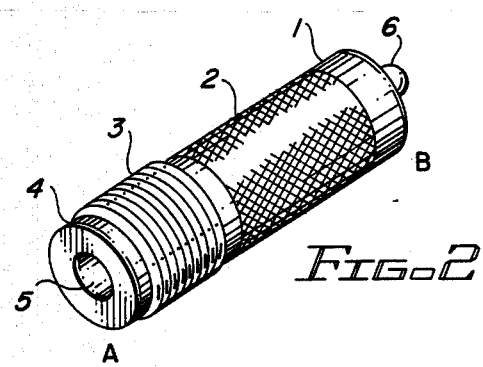
FIG. 2 is a perspective view of the speedometer and tachometer greasing apparatus of the invention.

Referring to the drawings, in FIG. 1 numeral 1 designates a one piece cylindrical body having a knurled section 2 around the circumference of the body 1, a series of raised external threads 3, and a short cylindrical lip 4 on end A. Hole 5 is centered in body 1 the entire length from end A to end B. A grease fitting 6 is pressed into hole 5 at end B of the main body 1.

Referring to FIG. 1, the cylindrical body 1, from end A to end B, is two inches in length. The body 1 has a three-quarters inch diameter at end A and end B; however, the diameter of the body 1 may be manufactured in various sizes to accommodate various sizes of external threads.

The knurled section 2 is one inch in length and extends completely around the circumference of the body 1. The knurled section 2 may also be manufactured with a cross section in the shape of a hexagon, octagon, or square rather than a cylinder to accommodate external leverage devices. The raised external threads 3 are seven-eights by eighteen SPECIAL FORM, having a GO GAGE length of three-eights inch. However, external raised threads, similar to raised external threads 3, may be produced in various sizes to accommodate the internal threads of different speedometer or tachometer cable housings.

The short cylindrical lip 4 has a length of one-eighth inch from end A to end B. The hole 5 has a five-sixteenths inch diameter and is centered in the body. Hole 5 is two inches in length from end A to end B. Hole 5 may be reduced in diameter and grease fitting 6 may be reduced accordingly to fit hole 5.

Grease fitting 6 is preferably made to be pressed into hole 5 and securely fastened to end B of the body 1. A threaded type of grease fitting similar to grease fitting 6 may be adapted to fit hole 5 at end B of the body 1 by tapping internal threads of a desired size into hole 5 of the body 1 at end B.

The body 1 is preferably made of a ferrous metal, however, it can be made of nonferrous metal or nonferrous material as well.

A transmission or motor end of a speedometer or tachometer cable housing having internal threads fitting the external threads 3 can be attached securely at end A of the body 1. An ordinary grease gun can be attached to the grease fitting 6 at end B. Grease can be pumped through the hole 5 from end B to end A continuing into the speedometer or tachometer cable housing.

Figure 3:
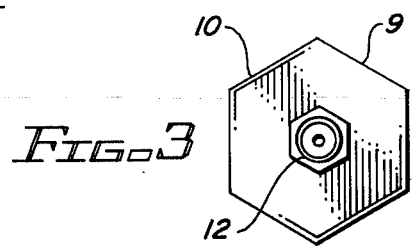
FIG. 3 is a front plan view of the marine steering cable lubricating apparatus of the invention.
Figure 5:
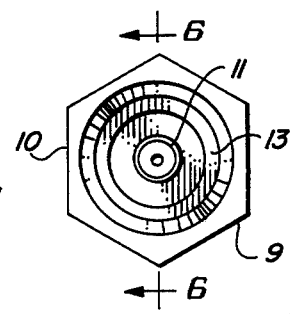
FIG. 5 is a rear plan view of the marine steering cable lubricating apparatus of the invention.
Figure 4:
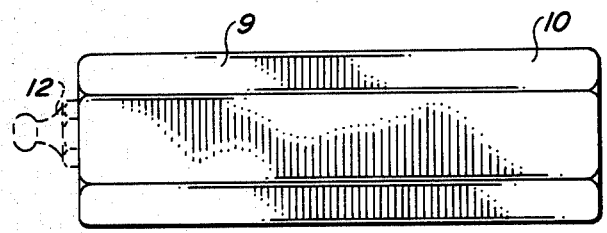
FIG. 4 is a side plan view of the marine steering cable lubricating apparatus of the invention.

An alternate embodiment of the greasing adaptor of the invention generally indicated by the numeral 9 is shown in FIGS. 3 through 7. The alternate embodiment of the greasing adaptor 9 can be seen in FIGS. 3 and 4 to have an elongated body 10 and a hexagonal cross section as shown in FIG. 3. The hexagonal cross section is preferred because it enables the greasing adaptor 9 to be engaged by a wrench or leverging device to tighten or loosen the adaptor. However, if desired, the cross section of the adaptor 9 may be in the shape of a circle, square, pentagon or the like.

Figure 7:
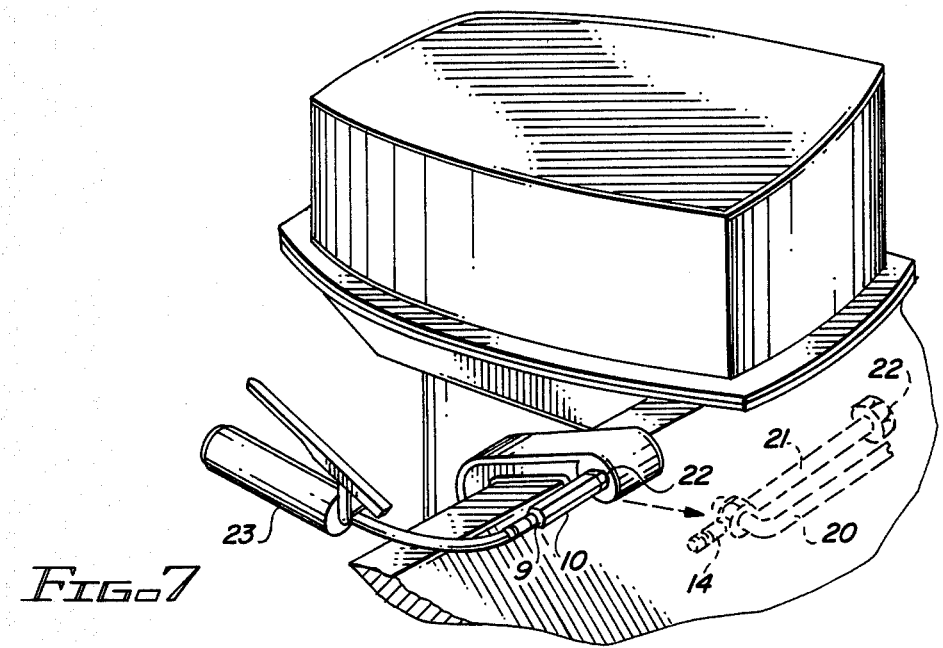
FIG. 7 is a perspective view of the marine steering cable apparatus of the invention connected to an outboard motor steering cable and to a grease gun.

Body 10 has a threaded hole 11 in the front end thereof for receipt of grease fitting 12. The threads in hole 11 may be omitted and a grease fitting may be force fitted therein if desired. At the rear end thereof body 10 has a larger threaded hole 13 therein for receipt of external or male threads such as male threads 14 shown in FIG. 7. Male threads 14 shown in FIG. 7 are located on the steering shaft of an outboard motor. However, hole 13 can receive any male threaded connection to a cable which is desired to be greased.

Figure 6:
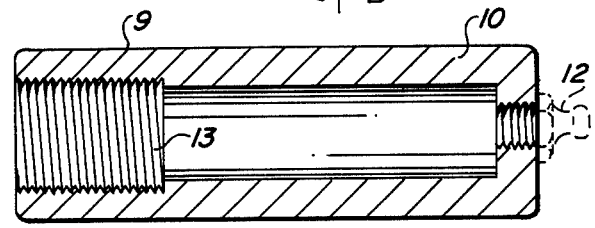
FIG. 6 is a cross-sectional view taken along lines 6—6 of FIG. 5.

As can be seen in FIG. 6, body 10 has a hollow interior 15 which permits grease and/or oil to travel through grease fitting 12, hole 11, through chamber 15 and on through threaded hole 13.

One of the many uses of the present invention is shown in FIG. 7 wherein the greasing adaptor 9 is utilized to lubricate the steering cable and housing of an outboard motor. To utilize the adaptor 9 of the present invention to lubricate a cable shaft, the steering link 20 shown in phantom lines in FIG. 7 is first removed from steering shaft 21. The steering shaft is then withdrawn into nut 22 until approximately ⅜ inch of threads 14 are exposed. Adaptor 9 is then threaded onto threads 14 and a grease gun 23 is connected to grease fitting 12 on adaptor 9. A light weight oil such as 10W30 motor oil is placed in grease gun 23 and the grease gun 23 is actuated to force oil throughout the length of the steering cable of the boat. Thus, the steering cable of a boat can be thoroughly and quickly lubricated using the adaptor shown in FIGS. 3 through 7, and the life of the cable can be greatly extended.

An additional embodiment of the present invention is shown in FIGS. 8 through 11 and is generally indicated by the numeral 24. The embodiment shown in FIG. 8 includes a nut 26 and a washer 28 which cooperate with cylindrical body 30. Cylindrical body 30 is similar to the one-piece cylindrical body 1 shown in FIG. 1. The embodiment shown in FIGS. 8 through 11 is used to lubricate a cable 48 and cable housing 34 shown in phantom lines which does not have an nut internally threaded attached thereto which will mate with the threads on cylindrical body 30. Nut 26, washer 28 and cylindrical body 30 cooperate to seize the cable housing 34 when nut 26 is tightened onto the threads 32 of cylindrical body 30.

Cylindrical body 30 has a hollow section 36 therein which terminates at grease fitting 38. Preferably, body 30 has a short cylindrical lip 40 at the end of threads 32 on which an "O" ring 42 may be placed. However, if desired, "O" ring 42 may be omitted, and lip 40 may also be omitted and threads 32 extended to the end 44 of body 30.

Body 30 has a hexagonal exterior portion 46 for grasping by a leveraging device such as a wrench.

Washer 28 shown in FIGS. 8 and 10 has a hole 50 therein sized for receipt of the cable housing 34 and cable 48 shown in phantom lines in FIG. 8. Preferably, washer 28 has the general shape of a truncated cone with a height H of approximately ¾ inch, and is sized to fit inside nut 26. Washer 28 is preferably made from a soft, flexible, elastic material such as rubber or the like.

Nut 26 preferably has a hexagonal outer surface 52 for grasping by a leveraging device such as a wrench. Nut 26 has internal or female threads 54, and a hole 56 in the front end 58 thereof which is smaller then hole 60 to prevent washer 28 from traveling through nut 26 and to form a seal with washer 28. Hole 56 preferably has a diameter D of about ½ inch and threads 54 define a hole 60 having a height T of about 13/16 inch. The total length L of nut 26 is preferably about ⅞ inch. Nut 26 must be sufficiently long enough to contain washer 28.

The ratio of L:D may vary from 2:1 to about 1½:1. The ratio of T:D may also vary from about 2:1 to 1½:1. The ratio of L:H may vary from about 2:1 to 1½:1.

To utilize the embodiment of the invention shown in FIGS. 8 through 11, cable housing 34 containing cable 48 is inserted through nut 26 and washer 28 as shown in FIG. 8. Nut 26 is then moved toward washer 28 around washer 28 until washer 28 is contained therein. Body 30 is then threaded into nut 26 sufficiently to connect body 30 to nut 26 and compress washer 28 about cable housing 34 to form a seal therewith. The seal prevents lubricant from flowing between hole 50 in washer 28 and cable housing 34, or around the outside of washer 28. A lubricant gun or grease gun is attached to grease fitting 38 as previously described in the description of the embodiments shown in FIGS. 1–7 to supply lubricant to assembly 24 and force lubricant into cable housing 34 to lubricate cable 48.

In FIG. 12 is shown another embodiment of the invention for lubricating cable housings having no nut connected thereto. Greasing adaptor 9 previously described is combined with nut 26 previously described and washer 28 previously described. The combination is effected by the use of body 60 having a hollow hexagonal external portion 62 and two hollow external threaded end portions 64 and 66. Body 60 is identical to body 30 with the exception that grease fitting 38 is removed a threaded portion identical to the portion of body 30 having threads 32 thereon is added to the end formerly having a grease fitting.

Thus, utilizing body 62, together with nut 26 and washer 28 adaptor 9 may be utilized to lubricate a cable having a nut thereon.

The disclosure of the invention described herein above represents the preferred embodiments of the invention; however, variations thereof, in the form, construction, and the modified application of the invention are possible without departing from the spirit and scope of the appended claims.

What is claimed is:

1. A two-piece apparatus for lubricating a cable and cable housing consisting of:
   a. an elongated, hollow, one-piece main body means for receiving and conveying lubricant from a lubricant source through the hollow portion thereof to a cable housing, said main body means having a first end and a second end, said first end having a hole therein for receipt of a grease fitting means, said second end having threads on the inside thereof for receipt in external threads located on one end of said cable housing, said main body means being constructed from a single continuous piece of rigid material, and
   b. grease fitting means rigidly connectable to said main body means for conveying lubricant from a grease gun to said main body means.

2. The apparatus of claim 1 wherein the outside of said main body means is generally hexagonal in shape.

3. The apparatus of claim 2 wherein said main body means has an area on the outside surface thereof adapted for grasping by a twisting device.

4. The apparatus of claim 1 wherein said hole in said first end has threads therein, and said grease fitting means has threads therein which mate with said threads in said hole in said first end.

5. The apparatus of claim 1 wherein said grease fitting means is connected to said main body means.

6. The apparatus of claim 5 wherein said grease fitting means is force fitted unto said hole in said first end of said main body means.

7. The apparatus of claim 1 wherein said apparatus is made of a ferrous metal.

8. The apparatus of claim 7 wherein said ferrous metal is selected from the group consisting of iron, steel, or stainless steel.

9. The apparatus of claim 1 wherein said apparatus is made of a non-ferrous metal.

10. The apparatus of claim 9 wherein said non-ferrous metal is selected from the group consisting of aluminum, magnesium, titanium, and brass.

11. The apparatus of claim 1 wherein said apparatus is made of plastic.

12. A four-piece apparatus for lubricating a cable and cable housing comprising:
   a. an elongated, hollow, one-piece main body means for receiving and conveying lubricant from a lubricant source through the hollow portion thereof to a cable housing, said main body means having a first end and a second end, said first end having a hole therein for receipt of a grease fitting means, said second end having threads on the outside thereof, said main body means being constructed from a single continuous piece of rigid material,
   b. washer means for forming a seal with said cable housing, said washer means having a hole in the center thereof for receipt of said cable housing,
   c. nut means having internal threads therein for receipt of said external threads located on said main body means, said nut means having a threaded first hole in one end thereof for receipt of said main body means and a second hole in the other end thereof for receipt of said cable housing means, and
   d. grease fitting means rigidly connectable to said main body means for conveying lubricant from a grease gun to said main body means.

13. The apparatus of claim 12 wherein said washer means is shaped like a truncated cone having a vertical hole in the center thereof.

14. The apparatus of claim 13 wherein said second hole in said nut means is smaller than said first hole.

15. The apparatus of claim 13 wherein the length of said nut means is sufficient to completely enclose said washer means.

16. The apparatus of claim 12 wherein the ratio of the length L of said nut means to the diameter D of said cable housing means ranges from about 2:1 to 1½:1.

17. The apparatus of claim 12 wherein the ratio in said nut means of the diameter T of said second hole to the diameter D of said first hole ranges from about 2:1 to about 1½:1.

18. The apparatus of claim 12 wherein the ratio of the length L of said nut means to the height H of said washer means ranges from about 2:1 to about 1½:1.

19. A five-piece apparatus for lubricating a cable and cable housing comprising:
   a. an elongated, hollow, one-piece first body means for receiving and conveying lubricant from a lubricant source through the hollow portion thereof to a cable housing, said first body means having a first end and a second end, said first end having a hole therein for receipt of a grease fitting means, said second end having threads on the inside thereof, said first body means being constructed from a single continuous piece of rigid material, b. an elongated, hollow, one-piece second body means for receiving and conveying lubricant from said first body means to a cable housing, said second body means having a first and second end having external threads thereon, said threads on said first end being adapted for receipt in said threads on said first body means, c. washer means for forming a seal with said cable housing, said washer means having a hole in the center thereof for receipt of said cable housing, d. nut means having internal threads therein for receipt of said external threads located on said second end of said second body means, said nut means having a threaded first hole in one end thereof for receipt of said second end of said second body means and a second hole in the other end thereof for receipt of said cable housing means, and e. grease fitting means rigidly connectable to said main body means for conveying lubricant from a grease gun to said main body means.

20. The apparatus of claim 19 wherein said washer means is shaped like a truncated cone having a vertical hole in the center thereof.

* * * * *